ELECTRON TRIGGER CIRCUITS

Filed Jan. 4, 1947

INVENTORS
Eugene R. Shenk
& Thomas J. Merson
BY H. S. Grover
ATTORNEY

Patented Feb. 6, 1951 2,540,551

UNITED STATES PATENT OFFICE 2,540,551

ELECTRON TRIGGER CIRCUITS

Eugene R. Shenk, Brooklyn, and Thomas J. Merson, Hollis, N. Y., assignors to Radio Corporation of America, a corporation of Delaware Application January 4, 1947, Serial No. 720,288

11 Claims. (Cl. 250—27)

This invention relates to electronic trigger circuits of the type having one degree of electrical stability. Such circuits have a stable state and an active state. They remain in the stable state until tripped into the active state by a voltage pulse of suitable polarity and magnitude. After a predetermined interval of time in the active state, determined primarily by the time constants of the circuit elements, the trigger circuit returns or restores itself to the stable state and so remains until again tripped by a suitable voltage.

The conventional electronic trigger circuit of the type described above presents a problem whenever it is desired to operate it from more than one voltage source. This problem involves isolating the input or tripping voltage sources from one another, and preventing undesired back-coupling from the trigger circuit to the input or tripping voltage sources. Heretofore, various means have been employed utilizing vacuum tubes and resistors in an attempt to achieve the desired isolation of the input or tripping voltage sources, but limitations have been encountered in the degree of isolation thus obtainable and in the number of separate input circuits permissible in operating a single tripping circuit.

The present invention overcomes these difficulties, and has for its primary object to provide a circuit scheme which enables a multiplicity of separate pulse generating circuits (input tripping voltage sources) to be employed in connection with a single trigger circuit while maintaining a high degree of isolation between the respective input circuits.

The system of the present invention permits the use of input tripping voltage sources ranging in number from two to twenty-five and higher, with a high degree of isolation between them and with negligible back-coupling from the trigger circuit to the input circuits.

Figure 1:
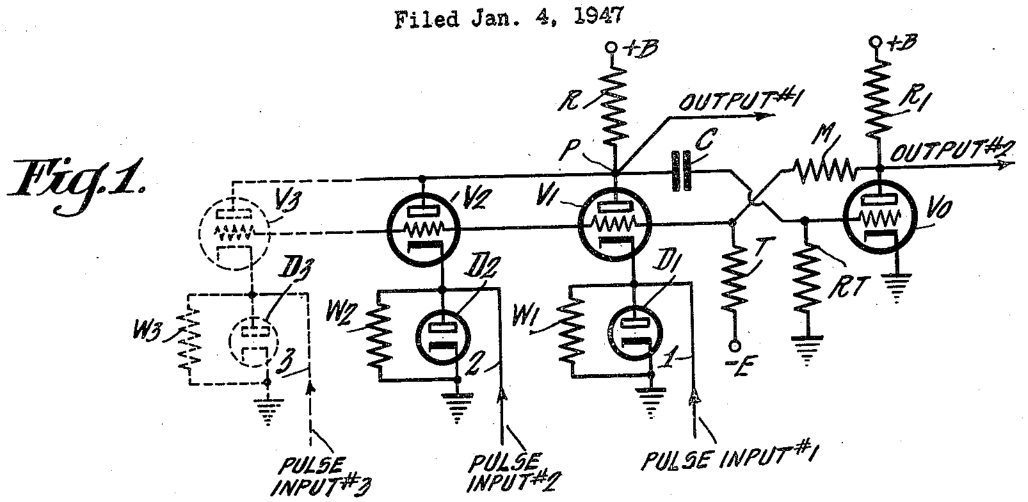
Figure 2:
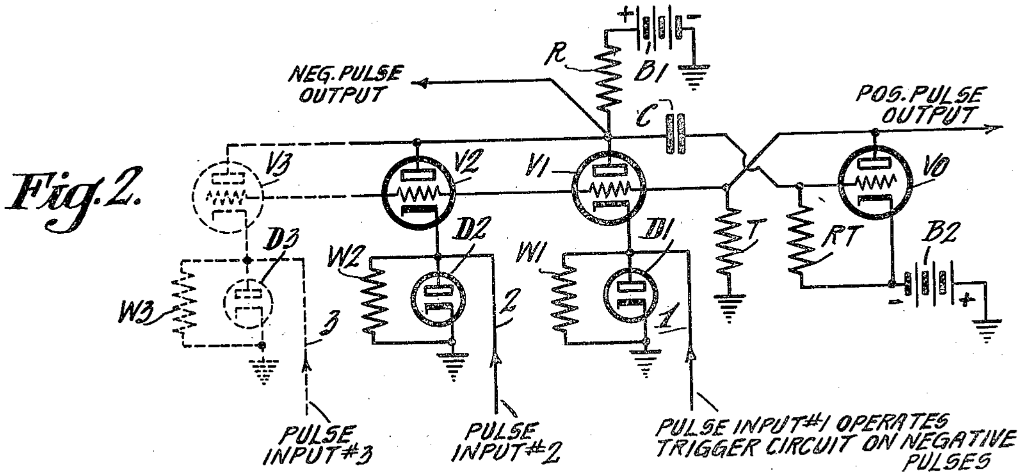
Figure 3:
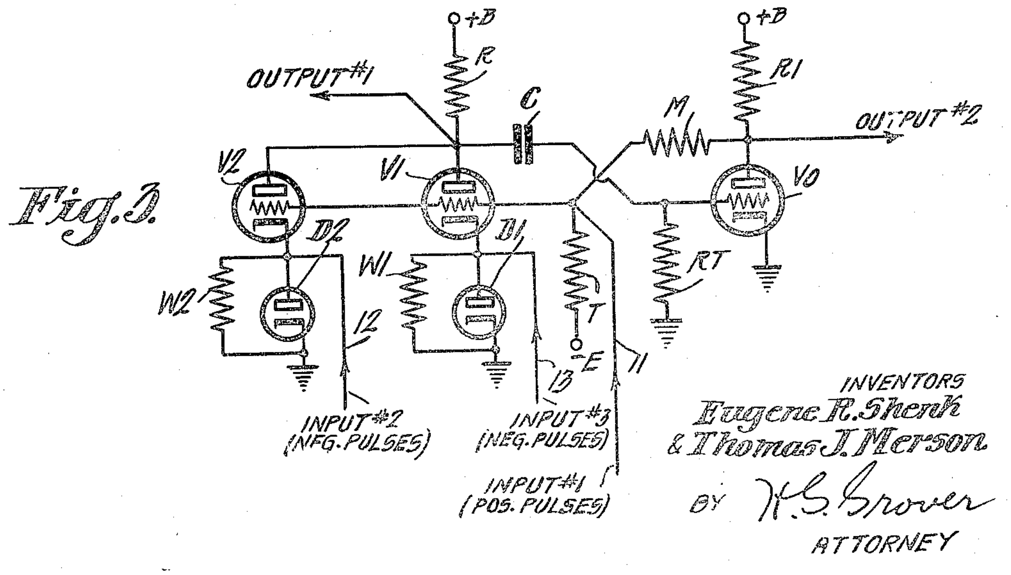

The following is a detailed description of the invention in conjunction with a drawing, wherein:

Figs. 1 and 2 schematically illustrate the invention as applied to two different types of electronic trigger circuits; and Fig. 3 illustrates another embodiment of the invention.

Referring to Fig. 1, there is shown a trigger circuit comprising vacuum tubes V0 and V1 whose grids and anodes are interconnected regeneratively. This trigger circuit is of the self-restoring type and has a stable state and an active state, and is described in detail in U. S. Patent 2,399,135 (Fig. 2 thereof) granted April 23, 1946. More specifically, the anodes of the two tubes V0 and V1 are supplied with positive polarizing potentials from the positive terminal +B of a source of unidirectional potential, through separate resistors R and R1. The anode of tube V1 is connected to the grid of tube V0 through a condenser C. While the anode of V0 is connected to the grid of tube V1 through a resistor M. Resistor M, if desired, may be shunted by a condenser. The grid of tube V1 is connected to the negative terminal —E of a source of biasing potential through a resistor T. The grid of tube V0 is connected to ground through a resistor RT which may be adjustable. The cathode of tube V1 is connected to ground through a high resistor W1, in turn, shunted by a diode D1. This diode D1 is an open circuit for any negative polarity input voltage pulse applied to lead 1, but aids in quickly dissipating such an input pulse once the trigger circuit trips to the active condition, i. e., once V1 conducts.

Normally, in the operation of the trigger circuit of Fig. 1, tube V1 is non-conductive and biased to cut-off by means of source —E. Tube V0, however is normally in a conductive state and passes current because its grid is maintained at or near zero bias. This condition of operation wherein tube V1 is normally non-conductive and tube V0 is normally conductive is called the stable state. In the active or tripped state, however, the current passing conditions of the tubes V1 and V0 are reversed from that just described. After an interval of time in the active state, depending in part upon the time constant of condenser C and resistor R, the trigger will restore itself to the stable state. In order to change the trigger circuit from the stable state to the active, a negative pulse is supplied to lead 1. These pulses should, of course have sufficient magnitude to trip the trigger circuit; that is, to reverse the current passing conditions of the two tubes V1 and V0. As an illustration, a pulse which will overcome the negative bias on the grid of tube V1 will cause this tube to pass current, and by virtue of the regenerative action of the circuit will cause tube V0 to cease conducting. In the stable state of the trigger circuit, condenser C will be charged to the full value of the potential +B, whereas in the active state of the trigger circuit, the condenser C will discharge over a circuit including resistor RT and also through the anode impedance of tube V1 in parallel with the anode resistor of tube V1. When the charge on condenser C has dissipated to a critical value, such that its discharge current no longer develops sufficient voltage across resistor RT to maintain the tube V0 biased at or beyond anode current cut-off, then the current conductive states of the two tubes will be reversed and the trigger circuit will be restored to the stable state. Rectangular wave output pulses are obtainable from either of the anodes of tubes V1 or V0, but of different polarity.

In accordance with the invention, additional input tripping voltage sources may be supplied to the trigger circuit V0, V1 by means of leads 2 and 3, by providing for each additional input source a vacuum tube having its anode and grid connected in parallel to the anode and grid of tube V1, and its cathode connected to ground through a diode shunted by a resistor. Thus, input #2 comprises a lead 2 connected to the cathode of vacuum tube V2 whose anode and grid electrodes are repsectively directly connected to the anode and grid electrodes of tube V1. The cathode of tube V2 is connected to ground through a diode D2 shunted by a resistor W2. Negative input or tripping pulses should be supplied to lead 2. Similarly, if a third tripping voltage source (input #3) is desired, then there would be provided a third pulse input lead 3, a vacuum tube V3 and diode D3 shunted by resistor W3, connected to tube V1 in the same manner as tube V2 and diode D2, described above. The use of resistors W1, W2 and W3 are not essential in the practice of the invention and may be omitted.

In the operation of the system of Fig. 1, a tripping voltage pulse of negative polarity and of suitable magnitude supplied to any one of the input leads 1, 2 and 3 will cause the associated tube V1, V2 and V3 to conduct. Since all the input grids and the anodes of tubes V1, V2 and V3 are respectively connected in parallel, it should be evident that when any one of these tubes conduct, then all of these tubes will conduct, thus lowering the positive potential of point P (due to the IR drop in resistor R). Consequently, condenser C begins to discharge. The normal triggering action follows; i. e., normally conducting tube V0 ceases to conduct and the multiplicity of tubes associated with tube V0 all conduct simultaneously and for a period of time determined primarily by the values of condenser C and resistor RT.

Because all the input circuits 1, 2 and 3 are connected to separate cathodes they are effectively isolated from each other. Each diode D1, D2 or D3 provides a very low impedance to ground for the cathode of its associated triode tube V1, V2 or V3 during the active state of the trigger circuit V0, V1. The space path impedance of the diode when current is passing therethrough is very small compared to the space path impedance of the triode which is directly connected to its anode, and hence excellent isolation is obtained between the pulse tripping voltage sources (not shown) connected to the input leads 1, 2 and 3.

Although three input circuits have been shown, it should be understood that as few as two input circuits may be used and as many as twenty-five and more used and still obtain the advantages of the invention.

When the number of separate input circuits becomes large (three or more), it may be desirable, though not essential, to choose a high value of anode resistor R and a tube V1 of low anode resistance. Then the impedance from point P to ground when V is conducting (in the active state of the trigger circuit), is small relative to the selected high value of R. In this case, the addition of tubes V2, V3 etc. in parallel with VI as shown, will not appreciably affect the current through the anode resistor R. Such an arrangement permits a multiplicity of separate input circuits to be used without greatly changing the voltages of the trigger circuit from their values under single input conditions wherein only tubes V0 and V1 would be used.

Fig. 2 shows the system of the invention as applied to a different type of electronic trigger circuit. The same parts in the two figures have been given the same reference numerals, and the description given above for Fig. 1 applies equally to Fig. 2 except for the specific type of trigger circuit.

The trigger circuit of Fig. 2 uses two sources of unidirectional potential B1 and B2 and differs from that of Fig. 1 in using fewer circuit elements. It should be noted that the anode resistor for tube V0 in Fig. 2 serves also as the grid resistor for tube V1 and there is no resistor between the grid of tube V1 and the anode of tube V0. This trigger circuit also has a stable state and an active state and requires a negative tripping voltage pulse. An advantage of the trigger circuit of Fig. 2 compared to that of Fig. 1 lies in the fact that there is obtainable an output pulse from point P which varies from negative to zero potential with respect to ground. Such a trigger circuit is described in Fig. 3 of copending application Serial No. 655,061 filed March 18, 1946, now abandoned.

Fig. 3 shows a modification of the system of Fig. 1 using a self-restoring trigger circuit V0, V2 and in which a first input circuit applies tripping pulses of positive polarity to the grid of the normally non-conductive vacuum tube V1 via lead 11, and a second input circuit applies tripping pulses of negative polarity via lead 12; and a third input circuit applies tripping pulses of negative polarity to the cathode of V1 via lead 13. Here again, the three separate input circuits are isolated from each other. Additional input circuits may be applied to the system of Fig. 3 in the same manner as shown in Figs. 1 and 2 by adding a vacuum tube and a diode in the cathode circuit of the added tube for each additional input circuit, in a manner similar to V2, W2. It should also be noted that there is a high degree of isolation between input sources connected to leads 11 and 13 even though both of these leads are connected to different electrodes of the same vacuum tube.

If desired, the system of Fig. 3 can be used with a source of negative tripping input pulses supplied to the grid of normally conductive vacuum tube V0 as a substitute for the source of positive pulses shown applied to the grid of tube VI.

The term "ground" used in the specification and claims is not limited to an actual earth connection but is deemed to include any suitable point of reference potential, for example, a point of zero D. C. or zero alternating current potential.

The term "diode" used in the specification and claims is not limited to an electron discharge device but is deemed to include any suitable unidirectional current passing device.

What is claimed is:

1. An electronic trigger circuit having a stable state and an active state, said circuit comprising a pair of vacuum tube electrode structures one of which is normally conductive and the other non-conductive in the stable state, and vice versa in the active state, each of said electrode structures having cathode, grid and anode electrodes, an input lead connected to an electrode of one of said electrode structures for supplying tripping pulses of suitable polarity to said trigger circuit, a third vacuum tube electrode structure having grid, anode and cathode electrodes, direct current connections between the grid and anode electrodes of said third vacuum tube electrode structure and the grid and anode electrodes, respectively, of the normally non-conductive electrode structure of said trigger circuit, a diode connected between the cathode of said third vacuum tube electrode structure and ground, and means connected to the cathode of said third vacuum tube structure for supplying tripping pulses to said trigger circuit.

2. An electronic trigger circuit having a stable state and an active state, said circuit comprising a pair of vacuum tube electrode structures one of which is normally conductive and the other non-conductive in the stable state, and vice versa in the active state, each of said electrode structures having cathode, grid and anode electrodes, a first source of tripping pulses of suitable polarity for said trigger circuit connected to an electrode of one of said electrode structures, a vacuum tube having grid, anode and cathode electrodes, direct current connections between the grid and anode electrodes of said vacuum tube and the grid and anode electrodes, respectively, of the normally non-conductive electrode structure of said trigger circuit, a diode having an anode connected to the cathode of said vacuum tube and a cathode connected to ground, and an input lead connected to the cathode of said vacuum tube for supplying tripping pulses to said trigger circuit from a second source.

3. A trigger circuit having one degree of electrical stability comprising a pair of vacuum tube electrode structures, one of which is normally conductive and the other of which is non-conductive in the stable state, and vice versa in the active state, said trigger circuit having means for restoring itself to the aforesaid stable state after a predetermined time interval in the active state, a diode serially connected in the cathode circuit of the normally non-conductive electrode structure, a source of tripping pulses of negative polarity connected to the cathode of said normally non-conductive structure, means for applying another source of tripping pulses of negative polarity to said trigger circuit without interaction between said sources, said means including a vacuum tube having anode and grid electrodes connected in parallel to the anode and grid electrodes of said normally non-conductive electrode structure and a diode serially connected in its cathode circuit, and a pulse input lead connected to the cathode of said vacuum tube.

4. A system as defined in claim 1, characterized in this, that said first source supplies pulses of positive polarity to the grid of the normally non-conductive vacuum tube electrode structure.

5. In combination, a self-restoring trigger circuit having a pair of electrode structures whose grids and anodes are interconnected for regenerative action, a series circuit of a relatively high impedance space discharge path and a low impedance space discharge path, means for connecting at least a part of said high impedance space discharge path across the grid and anode electrodes of one of said electrode structures, and an input circuit connected to the junction of said high and low impedance space discharge paths for supplying pulses of suitable polarity to trip said trigger circuit.

6. In combination a self-restoring trigger circuit having a pair of electrode structures whose grids and anodes are interconnected regeneratively, one of said structures being normally non-conductive and the other conductive in the stable state, and vice versa in the active state of said trigger circuit, a plurality of series circuits each having a relatively high impedance space discharge path in series with a low impedance space discharge path, means connecting at least a part of all of said high impedance space discharge paths in parallel and across the grid and anode electrodes of the normally non-conductive electrode structure of said trigger circuit, and separate input circuits for said series circuits, each input circuit supplying pulses of negative polarity to the junction of the high and low impedance space discharge path for tripping the trigger circuit.

7. An electronic trigger circuit having one degree of electrical stability and comprising first and second vacuum tube electrode structures each having an anode, a grid and a cathode, a condenser in series with a first resistor connecting the anode of said first structure and the cathode of said second structure, a direct connection from the condenser terminal of said resistor to the grid of said second structure, a connection including a second resistor from the cathode of said first structure to the anode of said second structure, a direct current connection between the grid of said first structure and the anode of said second structure, a source of unidirectional potential having a positive terminal connected through another resistor to the anode of said first structure, a second source of unidirectional potential having a negative terminal connected to the cathode of said second structure, a connection from the cathode of said first structure to the negative terminal of said first source and to the positive terminal of said second source, a vacuum tube having grid, cathode and anode electrodes, direct current connections between said last grid and anode electrodes and the grid and anode, respectively, of said first structure, a diode having an anode connected to the cathode of said last vacuum tube and a cathode connected to ground, and means for applying negative polarity tripping pulses connected to the anode of said diode.

8. In combination of self-restoring trigger circuit having a pair of electrode structures whose grids and anodes are interconnected regeneratively, one of said structures being normally non-conductive and the other conductive in the stable state, and vice versa in the active state of said trigger circuit, a plurality of series circuits each having a first space discharge path in series with a second space discharge path, means connecting at least a part of all of said first space discharge paths in parallel and across the grid and anode electrodes of the normally non-conductive electrode structure of said trigger circuit, and separate input circuits for said series circuits, each input circuit supplying pulses of negative polarity to the junction of said first and second space discharge path for tripping the trigger circuit.

9. A trigger circuit having one degree of electrical stability comprising a pair of grid-controlled vacuum tube electrode structures, one of which is normally conductive and the other of which is non-conductive in the stable state, and vice versa in the active state, said trigger circuit having means for restoring itself to the aforesaid stable state after a predetermined time interval in the active state, a diode serially connected in the cathode circuit of the normally non-conductive electrode structure, a source of tripping pulses of negative polarity connected to the cathode of said normally non-conductive structure, means for applying another source of tripping pulses of negative polarity to said trigger circuit without interaction between said sources, said means including a vacuum tube having anode and grid electrodes connected in parallel to the anode and grid electrodes of said normally non-conductive electrode structure and a diode serially connected in its cathode circuit, and a pulse input lead connected to the cathode of said vacuum tube, and a third source of tripping pulses supplying pulses of suitable polarity and magnitude to a grid of one of said pair of vacuum tube electrode structures.

10. The method of operating a self-restoring trigger circuit having a pair of electrode structures whose anodes and grids are interconnected regeneratively, one of said electrode structures being normally conductive and the other non-conductive in the stable state, and vice versa in the active state, which comprises controlling the state of said trigger circuit by paralleling the normally non-conductive electrode structure with different serially arranged space discharge paths, and supplying a plurality of tripping pulses to the different serially arranged paths, each tripping pulse being applied to a point between the space discharge paths of its respective series circuit and having such magnitude and polarity as to trip the trigger circuit.

11. The method of operating a self-restoring trigger circuit having a pair of electrode structures whose anodes and grids are interconnected regeneratively, one of said electrode structures being normally conductive and the other non-conductive in the stable state, and vice versa in the active state, which comprises controlling the state of said trigger circuit by paralleling the normally non-conductive electrode structure with different serially arranged space discharge paths, and supplying tripping pulses of negative polarity to the different serially arranged paths, each tripping pulse being applied to a point between the space discharge paths of its respective series circuit and having such magnitude as to trip the trigger circuit.

EUGENE R. SHENK.
THOMAS J. MERSON.

REFERENCES CITED

The following references are of record in the file of this patent:

UNITED STATES PATENTS

| Number | Name | Date |
|---|---|---|
| 2,399,135 | Miller et al. | Apr. 23, 1946 |
| 2,454,815 | Levy | Nov. 30, 1948 |

OTHER REFERENCES

Review of Scientific Instruments, vol. 14, June 1943.

"An Improved Cosmic-Ray Radio Sonde" by Pickering, pages 171–173.